INVENTOR
William C. Boston
By H. W. Williamson
Atty.

Feb. 24, 1931.  W. C. BOSTON  1,794,142
POSING APPARATUS FOR PHOTOGRAPHIC STUDIOS
Filed Aug. 26, 1927  2 Sheets-Sheet 2
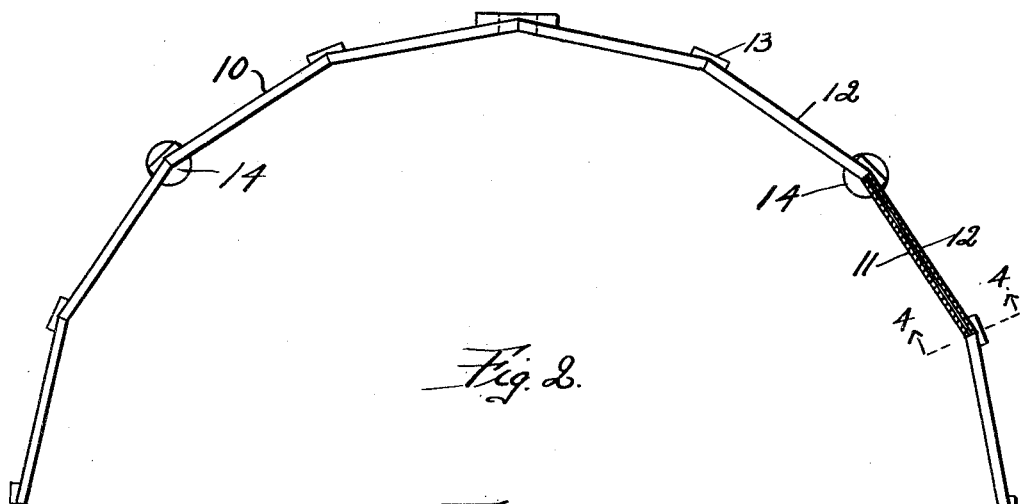
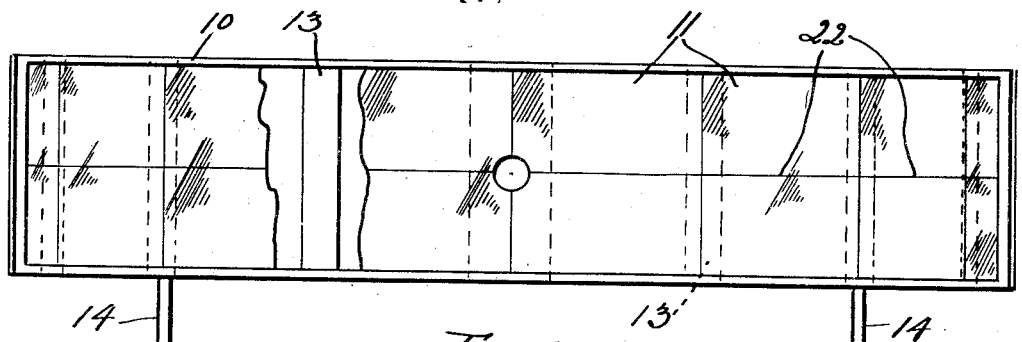
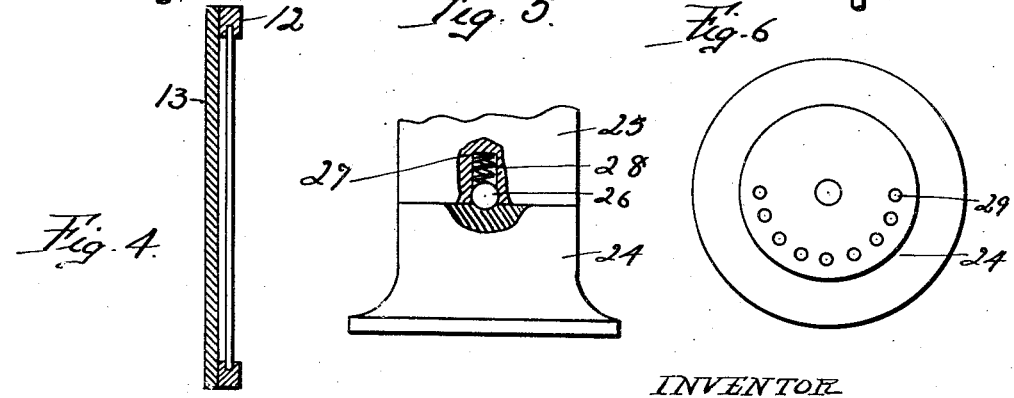
INVENTOR.
William C. Boston
By W. W. Williamson
Atty.

Patented Feb. 24, 1931

1,794,142

UNITED STATES PATENT OFFICE

WILLIAM C. BOSTON, OF RIDLEY PARK, PENNSYLVANIA

POSING APPARATUS FOR PHOTOGRAPHIC STUDIOS

Application filed August 26, 1927. Serial No. 215,554.

My invention relates to new and useful improvements in posing apparatus for photographic studios and has for its primary object to provide in combination with a camera, a swivel or revolving chair and a set of mirrors whereby the subject may readily pose himself and visualize his position and aspect.

Another object of the invention is to provide means to assist a person to assume various attitudes or positions prior to being photographed.

A further object of my invention is to provide a combination of mirrors having a unique arrangement whereby a person may readily ascertain whether or not the desired posture has been assumed.

A still further object of the invention is to provide in combination with a series of mirrors, a chair provided with means to temporarily hold it in a number of positions relative to the series of mirrors.

The apparatus herein described is particularly adapted for use with automatic or coin controlled cameras or photographic machines, wherein the subject to be photographed assumes different postures so that a number of photographs may be taken, showing the subject in different positions. At present, the subject is unable to know how he or she appears before being photographed, and therefore, the photographs are often displeasing. By the use of my invention, the subject may readily ascertain whether or not the photograph, when taken, will show him or her with a pleasant countenance or otherwise.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 2 is a plan or upper edge view of the set of mirrors with portions of one of the mirrors broken away and shown in section.

Fig. 3 is a front elevation thereof with portions of two of the mirrors broken away to illustrate the details of construction.

Fig. 4 is an enlarged sectional view of one of the mirrors on the line 4—4 of Fig. 2.

Fig. 5 is an enlarged side elevation of the chair base and a part of its standard, both being partly broken away and shown in section to illustrate a structural detail.

Fig. 6 is a top plan view of the chair base.

Figure 1:
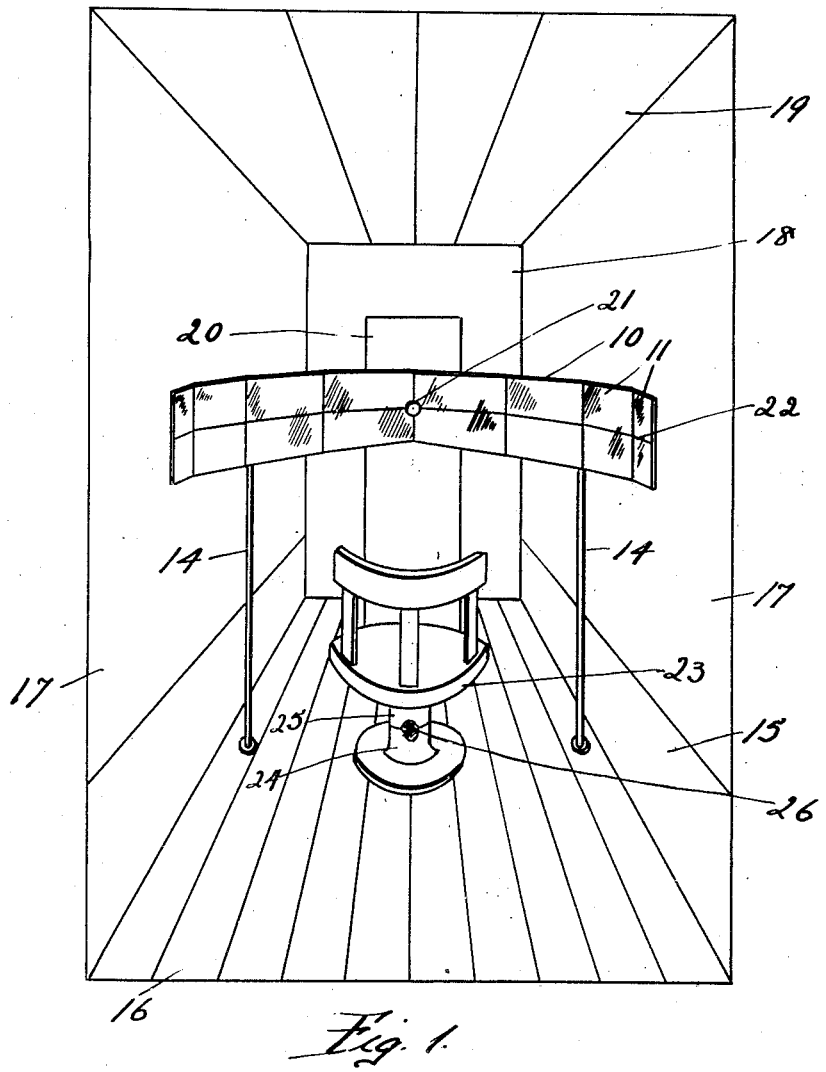
Fig. 1 is a perspective view of a studio showing an arrangement of my invention.

In carrying out my invention as herein embodied, 10 represents an image reflecting device consisting of a plurality of reflecting elements 11, preferably glass mirrors, and each of these elements is arranged at right angles to an imaginary line radiating from a point central of all the mirrors, said point, therefore, being the axis of the reflecting device 10.

While the number of mirrors may be varied, I have shown eight of them making up the set, because at the present time there is on the market an automatic camera or photographic machine, which makes eight exposures when a coin of certain denomination is placed in the machine. The mirrors are mounted in suitable frames 12, braced by cross pieces or uprights 13 and the whole reflecting device supported in some suitable manner as on the post 14.

For convenience of illustration, I have shown the reflecting device located in a studio 15 which may be the room of a building or it may be a compartment partitioned within a room of a building or it may be a combination of curtains or drops, and includes particularly a surface 16 such as a floor and may also include sides 17, a back 18 and a top 19.

Behind the reflecting device 10 is arranged the camera 20, the lens of which is in alignment with a hole 21, through the reflecting device between two adjacent mirrors or through a single mirror depending upon the particular arrangement of the mirror units relative to each other, and each of the mirrors has a horizontal line 22 thereon in the same horizontal plane as the hole 21.

At some suitable location facing the mirrors 11, preferably on the axis of the mirrors, is a chair 23 of the rotatable or swivel type so that the person to be photographed may sit in the chair and move into different positions for making photographs of different portions of the face. In other words, the person may swing the chair until he or she can look into one of the endmost mirrors so that a full side face view will be photographed and after one exposure is made, the chair may be turned until the subject sitting therein will look into the succeeding mirror, so that a photograph of a different part of the face will be taken. These movements are continued until each mirror has been viewed, and where there are eight of such mirrors, a like number of different views of the subject will be photographed. By looking into the mirrors, the subject can readily ascertain the appearance of his or her face and by keeping the eyes upon the line 22, the subject will be sure that the eyes will be photographed in their proper open positions.

In order to assist the subject in positioning the chair, I prefer that the same comprise a base 24 on which the standard 25 is swiveled or rotatably mounted in any well known or usual way, and said standard has a member 26, preferably a ball, slidably mounted in a chamber 27 and normally forced outward by a spring 28 to cause the member 26 to engage depressions 29 in the upper face of the base 24, so that when the member 26 is in one of the depressions, the seat of the chair will be temporarily held in a certain position and by applying a slight force to the chair seat as through the legs and body of the subject, said seat may be rotated until the member 26 is forced from one depression and caused to enter another at which time the subject will immediately become aware of the fact that the chair is in the proper position for the next photograph.

Of course I do not wish to be limited to the exact details of construction as herein shown, as these may be varied within the limits of the appended claims without departing from the spirit of my invention.

Having thus fully described my invention, what I claim as new and useful is:

1. A posing apparatus for photographic studios comprising a series of plane mirrors positioned substantially in a semi-circle and having a hole at a point midway the length of the combined mirrors and behind which a camera is to be located in alignment with said hole for taking the picture of a subject located in the axis of the combined mirrors.

2. In a positioning apparatus for photographic work, a set of mirrors, each at right angles to an imaginary radial line extending from the axis of the arc produced by the mirrors combined and behind which is to be located a camera having its lens in alignment with a hole through the mirror or mirrors adjacent said camera, and lines across the faces of said mirrors in the same horizontal plane as the hole.

3. A posing apparatus for photographic studios comprising a set of mirrors, each fixed at right angles to an imaginary radial line extending from the axis of the arc produced by the mirrors combined and behind which is to be located a camera having its lens in alignment with a hole through the mirror adjacent said camera and fixed sight means on said mirrors in horizontal alignment with the hole to cause the eyes of a subject to be photographed to be held at the proper level and the head maintained in a desired position.

In testimony whereof, I have hereunto affixed my signature.

WILLIAM C. BOSTON.